United States Patent [19]
Bertin

[11] 3,901,162
[45] Aug. 26, 1975

[54] SYSTEMS COMPRISING A COGWHEEL AND A LONGITUDINAL REACTION MEMBER COOPERATING WITH THE COGS THEREON

[75] Inventor: Jean Henri Bertin, Neuilly-sur-Seine, France

[73] Assignee: Bertin & Cie, Plaisir, France

[22] Filed: Sept. 11, 1974

[21] Appl. No.: 505,075

Related U.S. Application Data

[62] Division of Ser. No. 336,950, March 1, 1973, Pat. No. 3,854,418.

[30] Foreign Application Priority Data

Mar. 3, 1972 France .............................. 72.07481
Sept. 21, 1972 France .............................. 72.33405

[52] U.S. Cl. ........ 105/29 R; 104/23 FS; 104/147 R; 74/422
[51] Int. Cl. ............................................ B61b 13/08
[58] Field of Search.......... 104/148 MS, 23 FS, 132, 104/134, 118, 147 R, 148 R, 89; 105/29 R; 74/422, 461, 462

[56] References Cited
UNITED STATES PATENTS

| 144,076 | 10/1873 | Earl | 105/29 R |
| 3,581,666 | 6/1971 | Bertin | 104/23 FS |
| 3,589,205 | 6/1971 | Radovic | 105/29 R |

*Primary Examiner*—M. Henson Wood, Jr.
*Assistant Examiner*—D. W. Keen
*Attorney, Agent, or Firm*—A. W. Breiner

[57] ABSTRACT

A system comprising a cogwheel and a longitudinal reaction member cooperating with the cogs thereon, of the kind in which said reaction member is supported on a rigid longitudinal base through the agency of an elastic longitudinal member having two opposite faces of which one is in contact with said rigid base and the other in contact with said reaction member. The reaction member is a rack formed by cogs of substantially trapezoidal profile matching that of the cogs on said cogwheel and each extending from a root carried on said elastic member.

6 Claims, 2 Drawing Figures

PATENTED AUG 26 1975　　　　　　　　　　　　3,901,162
FIG.:1
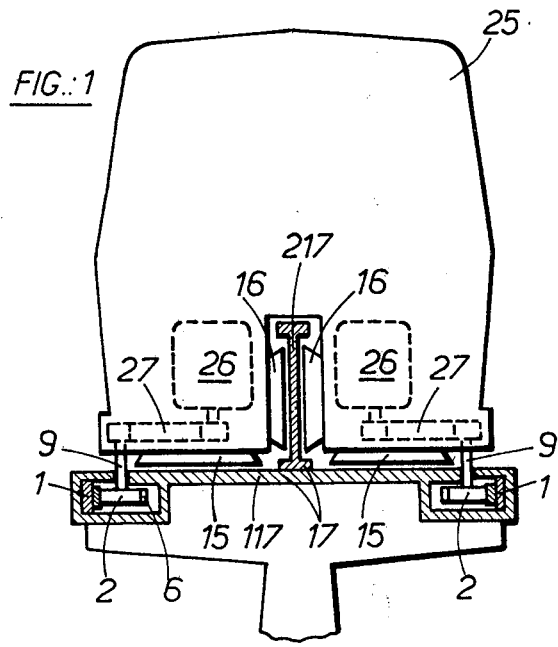
FIG.:2
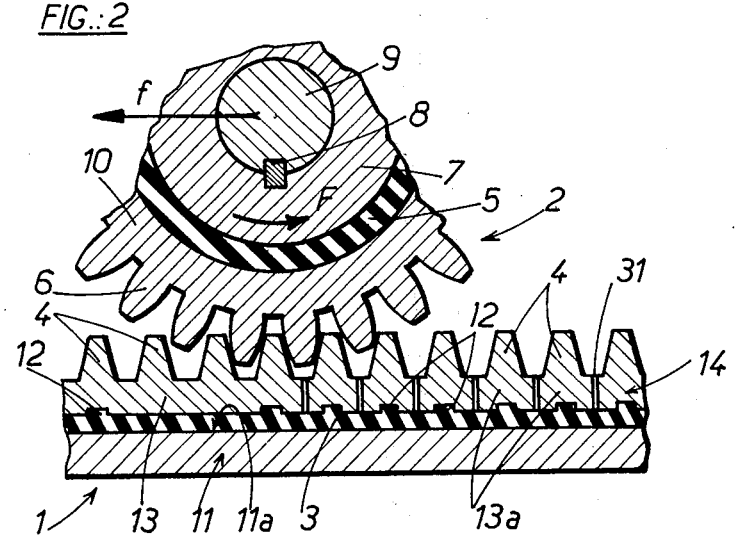

SYSTEMS COMPRISING A COGWHEEL AND A LONGITUDINAL REACTION MEMBER COOPERATING WITH THE COGS THEREON

This is a division of my patent application filed Mar. 1, 1973, Ser. No. 336,950, which became U.S. Pat. No. 3,854,418 on Dec. 17, 1974.

The present invention relates to a system comprising a cogwheel and a longitudinal reaction member cooperating with the cogs thereon, of the kind in which said reaction member is supported on a rigid longitudinal base through the medium of an elastic longitudinal member having two opposite faces of which one is in contact with said rigid base and the other in contact with said reaction member.

The invention is applicable more particularly though not exclusively to transport systems of the kind including a machine caused to travel along a longitudinal reaction member through the agency of a cogwheel which meshes therewith and is carried by said machine. As such, the invention is most notably applicable to transport systems comprising a ground effect machine supported and/or guided along a track with the interposition of at least one fluid cushion which is at a pressure greater than that of the surrounding medium, or of at least one layer of fluid at a pressure below that of said surrounding medium.

U.S. Pat. No. 2,652,785 describes a cogwheel/longitudinal reaction member system in which the reaction member is either a chain or a strip of metal with uniformly spaced holes therein, supported on the upper face of a longitudinal strip of rubber which in turn has its underface supported on a rigid longitudinal base.

A reaction member arrangement of this kind has several disadvantages.

Firstly, it leads to heavy wear on the rubber strip, which soon becomes unserviceable owing to the fact that the cogs on the cogwheel, which project through the links in the chain or the holes in the strip of metal, have their points making direct contact with the upper face of the rubber strip. As a result, the latter is subjected to intensive friction to an extent liable to cause pieces of material to be ripped off.

Secondly, such prior art system precludes effective exploitation of the elasticity and damping properties of the available volume of rubber, owing to the fact that the contact area between the chain or the perforated metal strip and the upper face of the rubber strip is small. Indeed in the case of a chain, such area is limited to mere contact lines, while in the case of a perforated metal strip it is reduced by the total area of the holes therein. In particular, such prior art arrangement provides only very inadequate damping of the vibration which in operation is engendered in the cogwheel/reaction member system.

It is the object of the present invention to overcome the above-mentioned drawbacks and to provide a cogwheel/reaction member system in which the reaction member is equipped with an elastic member which is protected against wear, lends itself well to vibration damping and is furthermore capable of storing, in the form of elastic deformation stresses, an appreciable amount of energy whereby to facilitate operation upon starting up the system.

In accordance with this invention, in a system of the above-mentioned kind, the reaction member is a rack bearing cogs which have a substantially trapezoidal profile matching that of the cogs on the cogwheel and each of which extends from a root carried by the elastic member.

It will be noted that in such a rack the existence of rack-cog roots prevents the tips of the cogs on the cogwheel from reaching the elastic member, thereby fully protecting the latter against wear due to friction.

It is to be noted likewise that the rack is in contact with the surface of the elastic member over a large area formed by the entire base area of the rack-cog roots, whereby efficient use is made of the available volume of elastic material. Such an arrangement consequently ensures efficient vibration damping and hence substantial reduction in the noise produced by the cogwheel/rack system in operation. In addition, by reason of the deformation of the elastic member, it enables an appreciable amount of energy to be stored progressively, thereby enabling the maximum driving torque available at start-up to be increased through the release of part of the energy stored thus.

In one form of embodiment of the invention, a plurality of rack-cogs project from the same root, thereby simplifying the construction of the rack.

In a preferred embodiment, each rack-cog projects from a root not rigidly connected to the roots of its two flanking cogs, thereby improving the local elasticity of the rack.

It is another teaching of this invention that the elastic member is formed with projecting or recessed portions which engage with matching recessed or projecting portions formed on said root or roots and/or on the rigid longitudinal base, whereby to prevent longitudinal relative slippage between the roots, the elastic member and the rigid base. Further, in order also to prevent such slippage, the elastic member may be made fast with said rigid base, by bonding for example.

The description which follows with reference to the accompanying non-limitative exemplary drawings will give a clear understanding of how the invention can be carried into practice.

In the drawings:

FIG. 1 is a diagrammatic cross-sectional illustration of a transport system comprising a machine propelled along a track by means of at least one cogwheel/rack system according to this invention; and FIG. 2 is a longitudinal sectional illustration of a cogwheel/rack system according to the invention.

Reference is first had to FIG. 1 for a showing of a transport system comprising a machine 25 movable along a track 17. In the illustrated example, the machine 25 is a ground effect machine supported and guided along said track with the interposition of fluid cushions.

The track 17 is of inverted-T cross-section comprising a bearing portion 117, which may be substantially horizontal, and a median guiding extension 217 which may be substantially vertical. The fluid cushions are confined by chambers such as plenum chambers 15 and 16 supplied, through the agency of means not shown in the drawings, with fluid at a pressure higher than the pressure of the surrounding medium.

Alternatively, the machine 25 could be supported and/or guided by means of layers of fluid at a pressure below that of the surrounding medium.

The machine 25 is propelled along the track 17 by means of two cogwheel/rack systems each of which includes a rack 1 extending along the track and a cogwheel 2 carried by the machine. Each cogwheel 2 is angularly fast with a shaft 9 driven by a motor 26 through speed reduction means 27. The cogs of each cogwheel are generally designated by reference numeral 6.

Reference is next had to FIG. 2 for a detail showing of the cogwheel/rack system. The rack 1 includes three distinct superimposed layers, to wit, a rigid longitudinal base 11, a longitudinal reaction member 14 and an intermediate longitudinal elastic member 3.

The rigid longitudinal base 11 serves as a load-bearing structure designed to absorb the forces which, in operation, are set up in the cogwheel/rack system. It comprises a face 11a which, in the exemplary illustration, is substantially flat. Preferably, this rigid base is rigidly connected to the track 17 shown in FIG. 1.

The reaction member 14 is that part of the rack which engages with cogwheel 2. It includes a plurality of rack-cogs 4 of substantially trapezoidal profile matching that of the cogs 6 of cogwheel 2, and each such rack-cog extends from a root. In a specific embodiment illustrated on the left-hand side of FIG. 2, a plurality of cogs 4 project from a common root 13. In an alternative embodiment shown on the right-hand side of FIG. 2, each cog 4 projects from a root 13a which is not connected to the roots of the two flanking cogs. Two consecutive roots 13a may be separated from each other by a small interval 31. In the particular example illustrated in the drawings, the base of root 13 or of each of the roots 13a is substantially flat.

The elastic member 3 extends over the entire useful length of the rack, between rigid base 11 and reaction member 14. It takes the general form of a strip having two opposite faces which, in the illustrated example, are substantially flat. Such strip may be made for example of natural rubber, or of synthetic rubber such as neoprene, perbunan or viton, or else of an elastic silicone. Alternatively, recourse could be had to certain plastics possessing properties of elasticity. The elastic member 3 may be either continuous or may consist of a plurality of sections laid end to end.

One of the faces of elastic member 3 is in contact with the face 11a of the rigid longitudinal base 11, to which it may be secured by bonding for example. The other face of elastic member 3 is in contact with the base of root 13 or of each of the roots 13a of the rack-cogs 4.

Further, elastic member 3 is formed with projecting or recessed portions 12 which engage with corresponding recessed or projecting portions formed on the root 13 (or the roots 13a) and/or on the rigid longitudinal base 11.

The cogwheel 2 comprises a hub 7 made angularly fast with a drive shaft 9 by a key 8, and a rim 10 bearing the cogs 6. A ring 5 made of elastic material may be provided if required between hub 7 and rim 10.

The arrow F indicates the direction of rotation of cogwheel 2, and the arrow f the direction of travel of the machine 25.

It is to be noted that, in the case of the rack 1 according to the present invention, in no case do the cogs 6 of cogwheel 2 make direct contact with elastic member 3, thereby obviating wear on the latter. It is likewise to be noted that reaction member 14 is supported on elastic member 3 over a large area formed by the total base area of the root 13 (or roots 13a) of cogs 4. As a result, effective use is made of the material of which elastic member 3 is made, whereby to improve elastic vibration damping and—as explained precedingly—enhance the performance of the cogwheel/rack system at start-up. It should be noted likewise that the effect of providing projecting or recessed portions 12 and securing the elastic member 3 to the rigid longitudinal base 11 is to prevent relative longitudinal slippage between the three superimposed layers forming the rack.

What I claim is:

1. In a system comprising a cogwheel and a longitudinal reaction member cooperating with the cogs thereon, of the kind in which said reaction member is supported on a rigid longitudinal base through the agency of an elastic longitudinal member having two opposite faces of which one is in contact with said rigid base and the other in contact with said reaction member, the improvement wherein that said reaction member is a rack formed by cogs of substantially trapezoidal profile matching that of the cogs on said cogwheel and each extending from a root carried on said elastic member.

2. A system according to claim 1, wherein a plurality of cogs extend from a common root.

3. A system according to claim 1, wherein each cog extends from a root not rigidly connected to the roots of its two flanking cogs.

4. A system according to claim 1, wherein said elastic member is formed with projecting or recessed portions respectively engaging with corresponding recessed or projecting portions formed on said root or roots.

5. A system according to claim 1, wherein said elastic member is formed with projecting or recessed portions respectively engaging with corresponding recessed or projecting portions formed on said rigid longitudinal base.

6. A system according to claim 1, wherein said elastic member is made fast with said rigid base, for example by bonding it thereto.

* * * * *